US012665293B2

(12) United States Patent
Lee et al.

(10) Patent No.: US 12,665,293 B2
(45) Date of Patent: Jun. 23, 2026

(54) ANTENNA STRUCTURE

(71) Applicant: Quanta Computer Inc., Taoyuan City (TW)

(72) Inventors: Yuan-Lung Lee, Taoyuan City (TW); Chih-Chun Lin, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 623 days.

(21) Appl. No.: 18/182,752

(22) Filed: Mar. 13, 2023

(65) Prior Publication Data

US 2024/0213666 A1 Jun. 27, 2024

(30) Foreign Application Priority Data

Dec. 22, 2022 (TW) ................................ 111214208

(51) Int. Cl.
*H01Q 1/52* (2006.01)
*H01Q 5/307* (2015.01)
*H01Q 9/04* (2006.01)

(52) U.S. Cl.
CPC ............ *H01Q 1/521* (2013.01); *H01Q 5/307* (2015.01); *H01Q 9/0407* (2013.01)

(58) Field of Classification Search
CPC ............ H01Q 1/22; H01Q 1/52; H01Q 1/243; H01Q 5/30–50
See application file for complete search history.

(56) References Cited

U.S. PATENT DOCUMENTS

| | | | | |
|---|---|---|---|---|
| 6,057,802 A * | 5/2000 | Nealy | H01Q 9/045 343/873 |
| 10,923,817 B2 * | 2/2021 | Qiu | H01Q 5/335 |
| 11,139,559 B2 * | 10/2021 | Wei | H01Q 5/364 |
| 12,212,055 B2 * | 1/2025 | Hu | H01Q 5/371 |
| 2015/0244080 A1 * | 8/2015 | Gregoire | H01Q 15/002 343/913 |
| 2019/0020110 A1 * | 1/2019 | Paulotto | H01Q 5/392 |
| 2023/0039854 A1 * | 2/2023 | Cao | H01Q 13/103 |

FOREIGN PATENT DOCUMENTS

CN 113381184 A * 9/2021 ........... H01Q 1/2258

* cited by examiner

*Primary Examiner* — Alexander H Taningco
(74) *Attorney, Agent, or Firm* — McClure, Qualey & Rodack, LLP

(57) ABSTRACT

An antenna structure includes a metal mechanism element, a first radiation element, a second radiation element, an impedance element, and a dielectric substrate. The metal mechanism element has a slot. The first radiation element has a first feeding point. The second radiation element has a second feeding point. The impedance element is coupled to the metal mechanism element. The impedance element is disposed between the first radiation element and the second radiation element. The dielectric substrate is adjacent to the slot of the metal mechanism element. The first radiation element, the second radiation element, and the impedance element are disposed on the dielectric substrate. The impedance element is configured to increase the isolation between the first radiation element and the second radiation element.

9 Claims, 7 Drawing Sheets

ANTENNA STRUCTURE

CROSS REFERENCE TO RELATED APPLICATIONS

This application claims priority of Taiwan Patent Application No. 111214208 filed on Dec. 22, 2022, the entirety of which is incorporated by reference herein.

BACKGROUND OF THE INVENTION

Field of the Invention

The disclosure generally relates to an antenna structure, and more particularly, to an antenna structure with high isolation.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are essential components in any mobile device that supports wireless communication. Since the amount of space in the interior of a mobile device is very limited, multiple antennas and their transmission lines are usually disposed close to each other. This spacing may lead to serious interference between them. As a result, there is a need to propose a novel solution for solving the problem of poor isolation in the conventional design.

BRIEF SUMMARY OF THE INVENTION

In an exemplary embodiment, the invention is directed to an antenna structure that includes a metal mechanism element, a first radiation element, a second radiation element, an impedance element, and a dielectric substrate. The metal mechanism element has a slot. The first radiation element has a first feeding point. The second radiation element has a second feeding point. The impedance element is coupled to the metal mechanism element. The impedance element is disposed between the first radiation element and the second radiation element. The dielectric substrate is adjacent to the slot of the metal mechanism element. The first radiation element, the second radiation element, and the impedance element are disposed on the dielectric substrate. The impedance element is configured to increase the isolation between the first radiation element and the second radiation element.

In some embodiments, the slot of the metal mechanism element is a closed slot with a straight-line shape.

In some embodiments, the first radiation element substantially has a variable-width L-shape.

In some embodiments, the first radiation element has a first vertical projection on the metal mechanism element, and the first vertical projection at least partially overlaps the slot of the metal mechanism element.

In some embodiments, the second radiation element substantially has a variable-width L-shape.

In some embodiments, the second radiation element has a second vertical projection on the metal mechanism element, and the second vertical projection at least partially overlaps the slot of the metal mechanism element.

In some embodiments, the impedance element is a capacitive element, an inductive element, or a resistive element.

In some embodiments, the impedance element includes a first metal element, a second metal element, a third metal element, and a fourth metal element. The first metal element is coupled to a first connection point on the metal mechanism element. The second metal element is coupled to a second connection point on the metal mechanism element. The third metal element is coupled to a third connection point on the metal mechanism element. The fourth metal element is coupled to a fourth connection point on the metal mechanism element. The first metal element, the second metal element, the third metal element, and the fourth metal element are adjacent to each other. A cross-shaped partition gap is formed between the first metal element, the second metal element, the third metal element, and the fourth metal element.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the slot of the metal mechanism element is substantially equal to 0.5 wavelength of the first frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
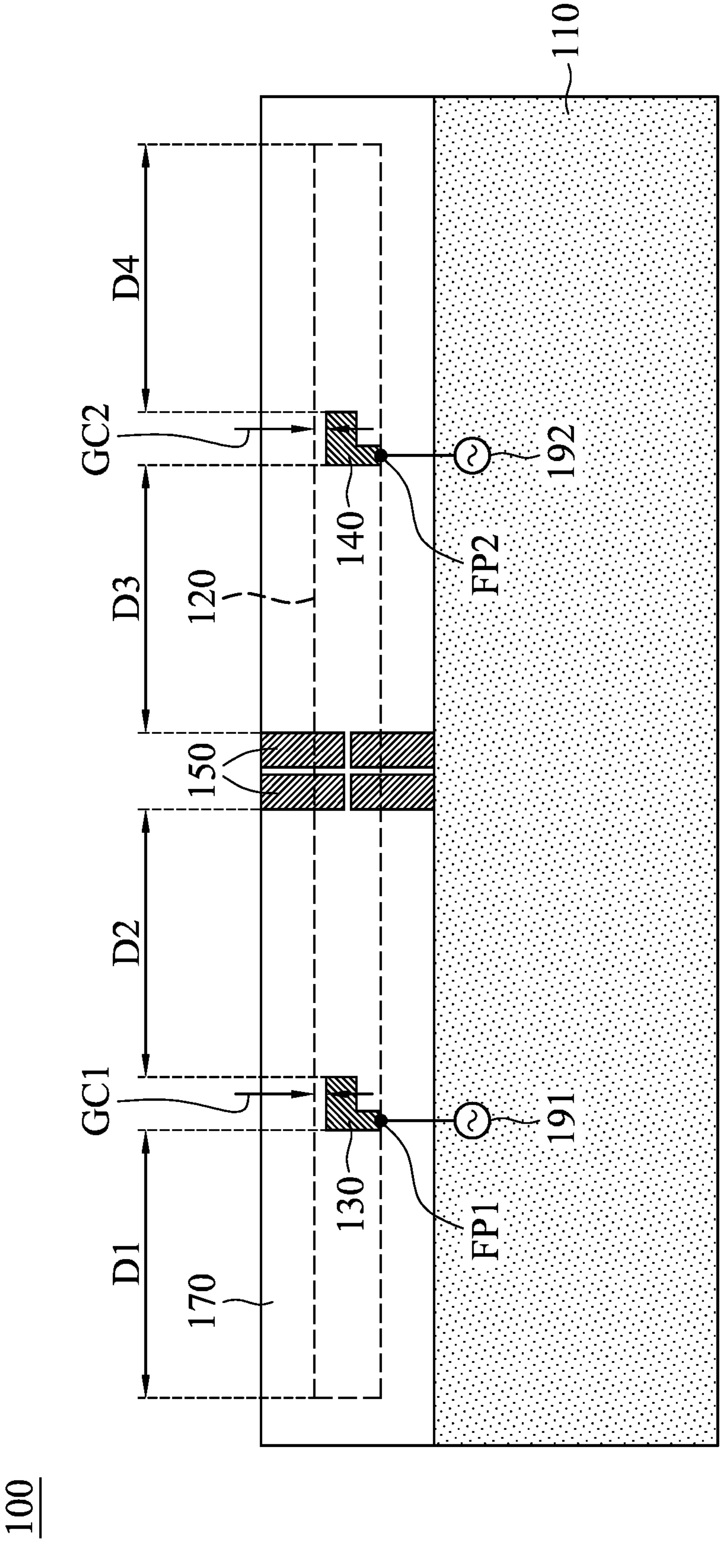
FIG. 1A is a see-through view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
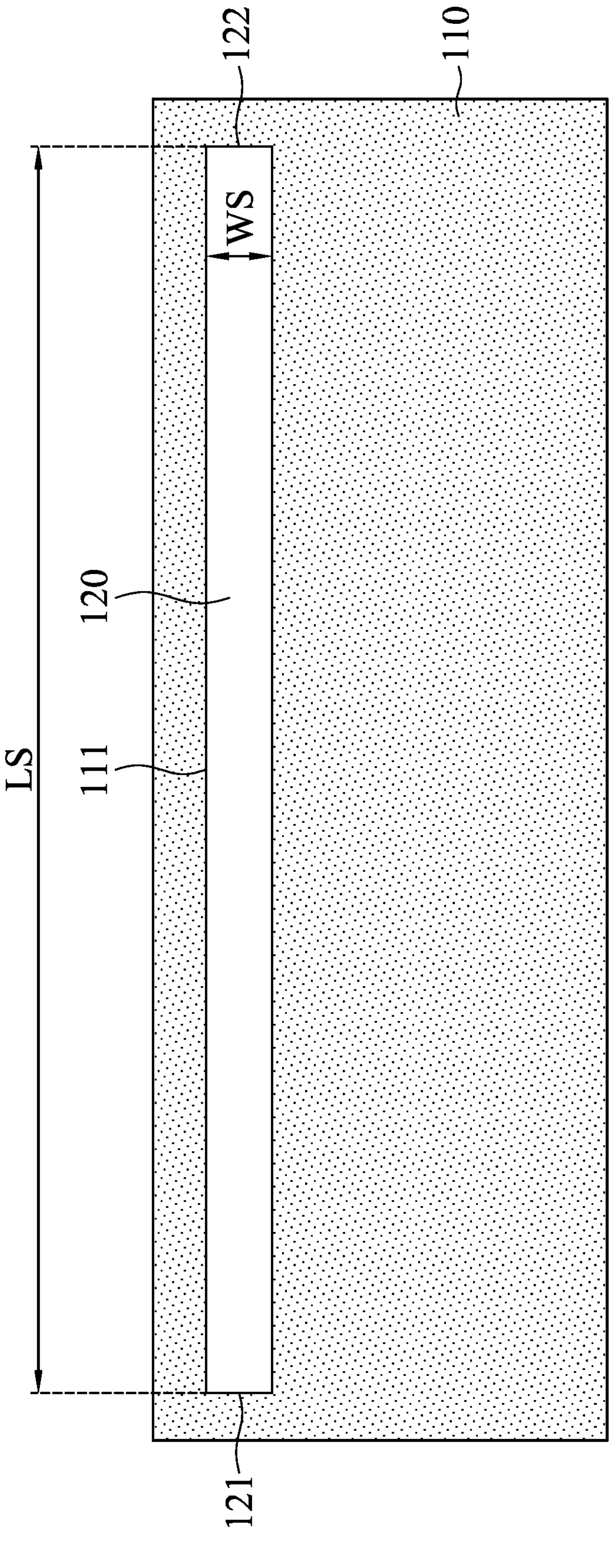
FIG. 1B is a partial view of a lower layer of an antenna structure according to an embodiment of the invention.
Figure 1C:
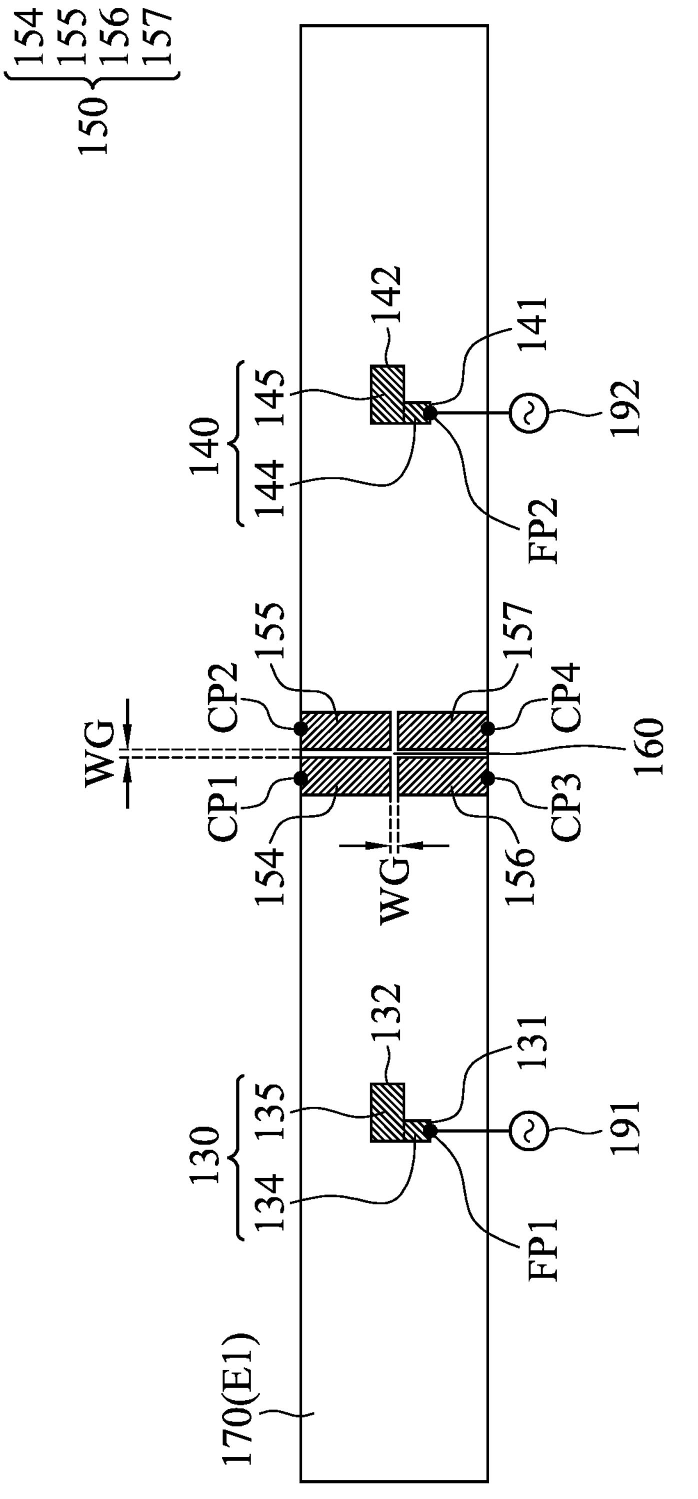
FIG. 1C is a partial view of a higher layer of an antenna structure according to an embodiment of the invention.
Figure 1D:
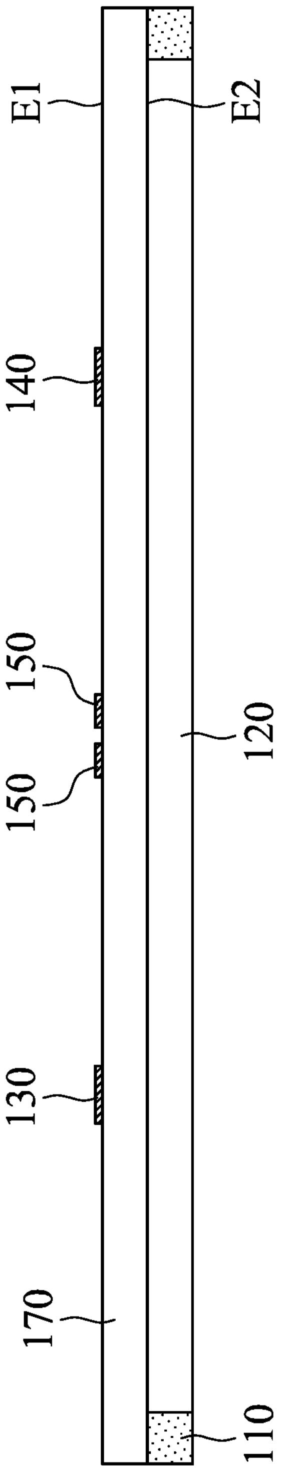
FIG. 1D is a sectional view of an antenna structure according to an embodiment of the invention.

FIG. 1A is a see-through view of an antenna structure 100 according to an embodiment of the invention. FIG. 1B is a partial view of a lower layer of the antenna structure 100 according to an embodiment of the invention. FIG. 1C is a partial view of a higher layer of the antenna structure 100 according to an embodiment of the invention. FIG. 1D is a sectional view of the antenna structure 100 according to an embodiment of the invention. Please refer to FIG. 1A, FIG. 1B, FIG. 1C and FIG. 1D together. The antenna structure 100 may be applied to a mobile device, such as a smart phone, a tablet computer, or a notebook computer. In the embodiment of FIG. 1A, FIG. 1B, FIG. 1C and FIG. 1D, the antenna structure 100 includes a metal mechanism element 110, a first radiation element 130, a second radiation element 140, an impedance element 150, and a dielectric substrate 170. The first radiation element 130, the second radiation element 140, and the impedance element 150 may all be made of metal materials, such as copper, silver, aluminum, iron, or their alloys.

The metal mechanism element 110 has a slot 120. The slot 120 of the metal mechanism element 110 may substantially have a straight-line shape. Specifically, the slot 120 may be a closed slot with a first closed end 121 and a second closed end 122 away from each other. In some embodiments, the metal mechanism element 110 further includes a nonconductive material (not shown), which fills the slot 120 of the metal mechanism element 110, so as to achieve the waterproof or dustproof function.

The dielectric substrate 170 may be an FR4 (Flame Retardant 4) substrate, a PCB (Printed Circuit Board), or a FPC (Flexible Printed Circuit). The dielectric substrate 170 has a first surface E1 and a second surface E2 which are opposite to each other. The first radiation element 130, the second radiation element 140, and the impedance element 150 may all be disposed on the first surface E1 of the dielectric substrate 170. The second surface E2 of the dielectric substrate 170 is adjacent to the slot 120 of the metal mechanism element 110. It should be noted that the term "adjacent" or "close" over the disclosure means that the distance (spacing) between two corresponding elements is smaller than a predetermined distance (e.g., 5 mm or the shorter), or means that the two corresponding elements directly touch each other (i.e., the aforementioned distance/spacing between them is reduced to 0). In some embodiments, the second surface E2 of the dielectric substrate 170 is directly attached to the metal mechanism element 110, such that the dielectric substrate 170 can at least partially cover the slot 120 of the metal mechanism element 110.

The first radiation element 130 may substantially have a variable-width L-shape. Specifically, the first radiation element 130 has a first end 131 and a second end 132. A first feeding point FP1 is positioned at the first end 131 of the first radiation element 130. The second end 132 of the first radiation element 130 is an open end. The first feeding point FP1 may be further coupled to a first signal source 191. For example, the first signal source 191 may be an RF (Radio Frequency) module. In some embodiments, the first radiation element 130 includes a first narrow portion 134 adjacent to the first end 131 and a first wide portion 135 adjacent to the second end 132. The first wide portion 135 may be substantially perpendicular to the first narrow portion 134. In addition, a first coupling gap GC1 may be formed between the first wide portion 135 of the first radiation element 130 and an inner edge 111 of the metal mechanism element 110. In some embodiments, the first radiation element 130 has a first vertical projection on the metal mechanism element 110, and the first vertical projection at least partially overlaps the slot 120 of the metal mechanism element 110. For example, the whole first vertical projection may be inside the slot 120 of the metal mechanism element 110, but it is not limited thereto.

The second radiation element 140 may substantially have another variable-width L-shape. Specifically, the second radiation element 140 has a first end 141 and a second end 142. A second feeding point FP2 is positioned at the first end 141 of the second radiation element 140. The second end 142 of the second radiation element 140 is an open end. For example, the second end 142 of the second radiation element 140 and the second end 132 of the first radiation element 130 may substantially extend in the same direction. The second feeding point FP2 may be further coupled to a second signal source 192. For example, the second signal source 192 may be another RF module. In some embodiments, the second radiation element 140 includes a second narrow portion 144 adjacent to the first end 141 and a second wide portion 145 adjacent to the second end 142. The second wide portion 145 may be substantially perpendicular to the second narrow portion 144. In addition, a second coupling gap GC2 may be formed between the second wide portion 145 of the second radiation element 140 and the inner edge 111 of the metal mechanism element 110. In some embodiments, the second radiation element 140 has a second vertical projection on the metal mechanism element 110, and the second vertical projection at least partially overlaps the slot 120 of the metal mechanism element 110. For example, the whole second vertical projection may be inside the slot 120 of the metal mechanism element 110, but it is not limited thereto.

The impedance element 150 is coupled to the metal mechanism element 110. The impedance element 150 is disposed between the first radiation element 130 and the second radiation element 140. For example, the impedance element 150 may be a capacitive element, an inductive element, or a resistive element, but it is not limited thereto. Generally, the impedance element 150 is configured to increase the isolation between the first radiation element 130 and the second radiation element 140. The impedance element 150 may extend across the slot 120 of the metal mechanism element 110. In some embodiments, the impedance element 150 has a third vertical projection on the metal mechanism element 110, and the third vertical projection at least partially overlaps the slot 120 of the metal mechanism element 110.

In some embodiments, if the impedance element 150 is a capacitive element, it will include a first metal element 154, a second metal element 155, a third metal element 156, and a fourth metal element 157. For example, each of the first metal element 154, the second metal element 155, the third metal element 156, and the fourth metal element 157 may substantially have a rectangular shape, but it is not limited thereto. The first metal element 154, the second metal element 155, the third metal element 156, and the fourth metal element 157 may be adjacent to each other. Furthermore, a cross-shaped partition gap 160 can be formed between the first metal element 154, the second metal element 155, the third metal element 156, and the fourth metal element 157. Specifically, the first metal element 154 is coupled to a first connection point CP1 on the metal mechanism element 110. The second metal element 155 is coupled to a second connection point CP2 on the metal mechanism element 110. The third metal element 156 is coupled to a third connection point CP3 on the metal mechanism element 110. The fourth metal element 157 is coupled to a fourth connection point CP4 on the metal mechanism element 110. For example, the first connection point CP1, the second connection point CP2, the third connection point CP3, and the fourth connection point CP4 may be different from each other. For example, the first connection point CP1 and the second connection point CP2 may be positioned at the upper side of the slot 120, and the third connection point CP3 and the fourth connection point CP4 may be positioned at the lower side of the slot 120. It should be understood that the aforementioned structure of the impedance element 150 is merely exemplary, rather than limitations of the invention. In alternative embodiments, the detailed structure of the impedance element 150 is adjustable according to different requirements.

Figure 2:
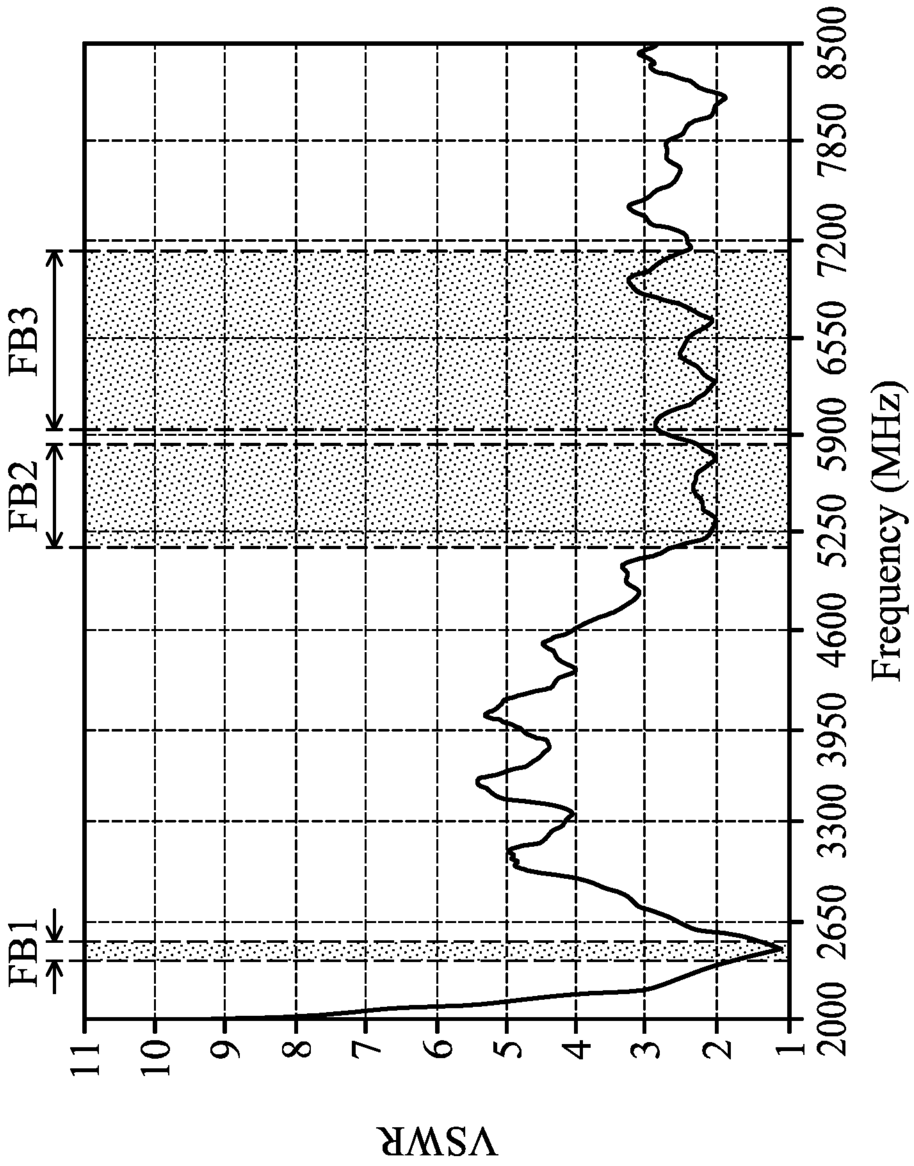
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, if the slot 120 of the metal mechanism element 110 is excited by the first radiation element 130 and the first signal source 191 using a coupling mechanism, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz.

Figure 3:
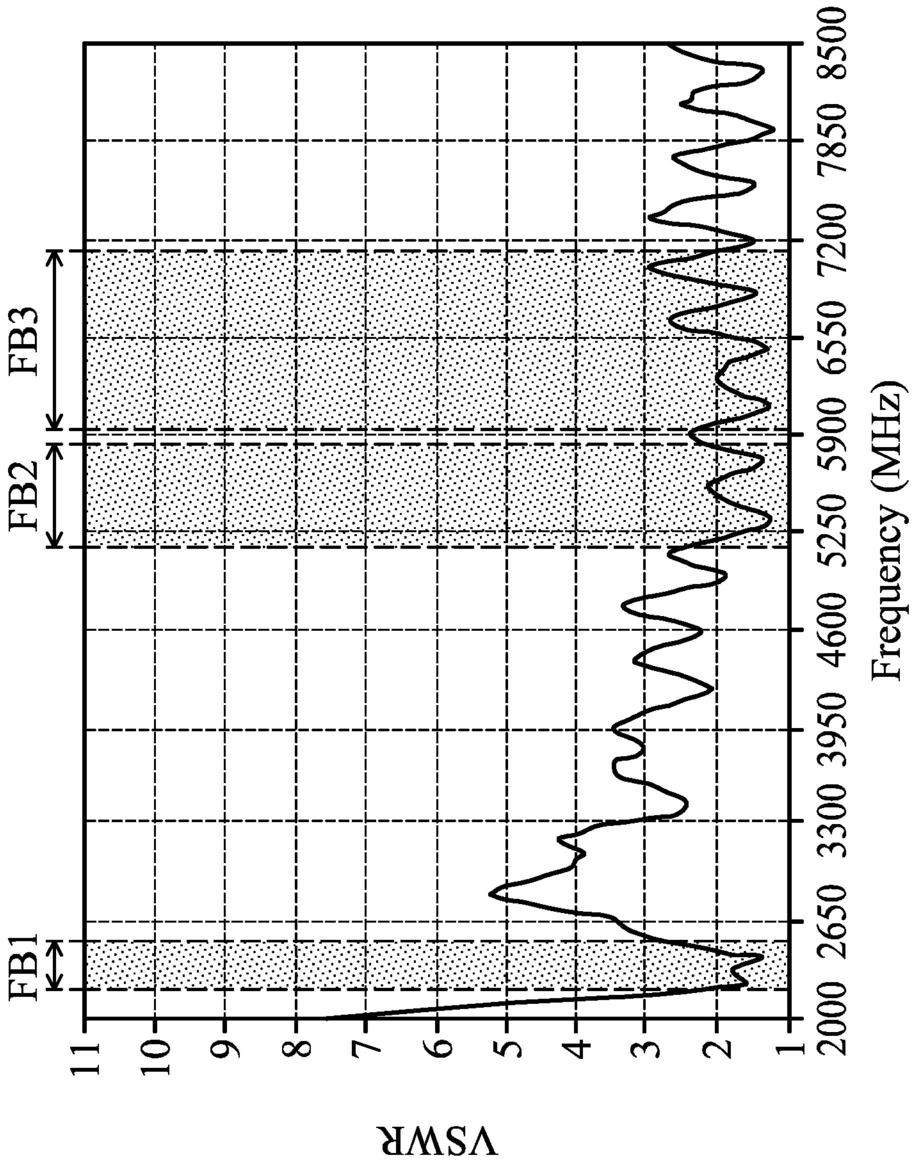
FIG. 3 is a diagram of VSWR of an antenna structure according to another embodiment of the invention.

FIG. 3 is a diagram of VSWR of the antenna structure 100 according to another embodiment of the invention. The horizontal axis represents the operational frequency (MHz), and the vertical axis represents the VSWR. According to the measurement of FIG. 3, if the slot 120 of the metal mechanism element 110 is excited by the second radiation element 140 and the second signal source 192 using another coupling mechanism, the antenna structure 100 can also cover the first frequency band FB1, the second frequency band FB2, and the third frequency band FB3 as mentioned above. Therefore, the antenna structure 100 can support at least the wideband operations of the conventional WLAN (Wireless Local Area Network) and the next-generation Wi-Fi 6E.

On the other hand, according to practical measurements, the radiation gain of the antenna structure 100 can reach −3 dB or higher within the first frequency band FB1, the second frequency band FB2, and the third frequency band FB3 as mentioned above. It can meet the requirements of practical applications of general mobile communication devices.

Figure 4:
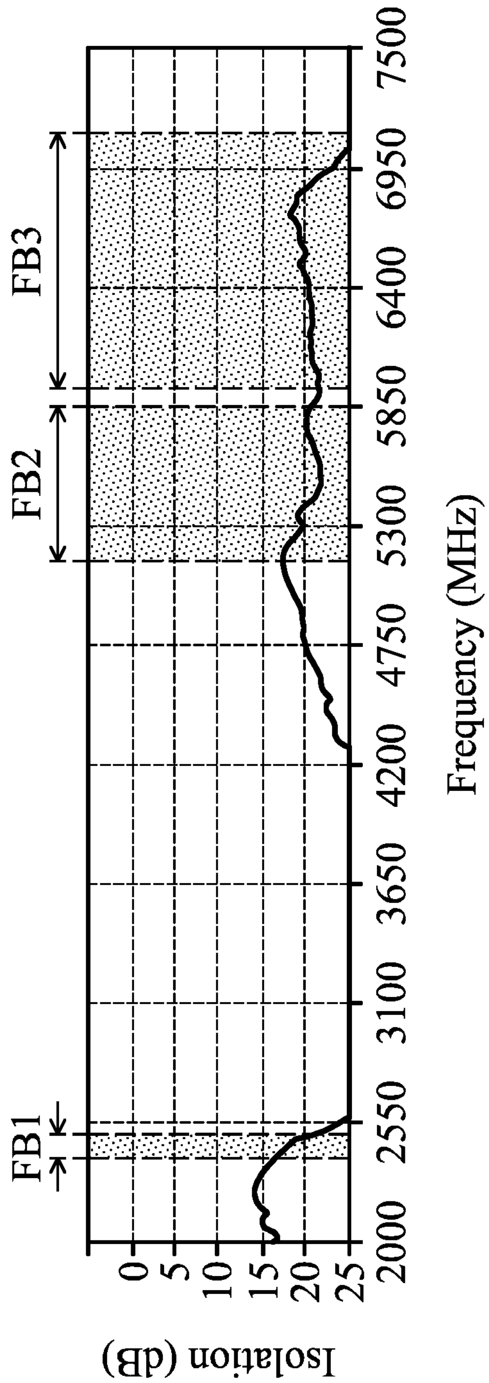
FIG. 4 is a diagram of isolation between a first radiation element and a second radiation element according to an embodiment of the invention.

FIG. 4 is a diagram of the isolation between the first radiation element 130 and the second radiation element 140 according to an embodiment of the invention. The horizontal axis represents the operational frequency (MHz), and the vertical axis represents the isolation (dB). For example, if the first feeding point FP1 is set as a first port (Port 1) and the second feeding point FP2 is set as a second port (Port 2), the absolute value of the S21 parameter between the first port and the second port can be considered as the isolation between the first radiation element 130 and the second radiation element 140. According to the measurement of FIG. 4, the isolation of the antenna structure 100 can reach 15 dB or higher within the first frequency band FB1, the second frequency band FB2, and the third frequency band FB3 as mentioned above. In other words, the incorporation of the impedance element 150 can help to significantly enhance the isolation of the antenna structure 100. Accordingly, the antenna structure 100 can maintain good communication quality without additionally increasing its whole size.

In some embodiments, the element sizes and element parameters of the antenna structure 100 will be described as follows. The length LS of the slot 120 of the metal mechanism element 110 may be substantially equal to 0.5 wavelength (λ/2) of the first frequency band FB1 of the antenna structure 100. The width WS of the slot 120 of the metal mechanism element 110 may be shorter than 2 mm, or may be from 2 mm to 4 mm. The first coupling gap GC1 may be from 0.1 mm to 0.5 mm. The second coupling gap GC2 may be from 0.1 mm to 0.5 mm. The first distance D1 between the first radiation element 130 and the first closed end 121 of the slot 120 may be sustantially equal to 0.125 wavelength (λ/8) of the first frequency band FB1 of the antenna structure 100. The second distance D2 between the first radiation element 130 and the impedance element 150 may be substantially equal to 0.125 wavelength (λ/8) of the first frequency band FB1 of the antenna structure 100. The third distance D3 between the second radiation element 140 and the impedance element 150 may be substantially equal to 0.125 wavelength (λ/8) of the first frequency band FB1 of the antenna structure 100. The fourth distance D4 between the second radiation element 140 and the second closed end 122 of the slot 120 may be substantially equal to 0.125 wavelength (λ/8) of the first frequency band FB1 of the antenna structure 100. If the impedance element 150 is a capacitive element, the width WG of its cross-shaped partition gap 150 may be smaller than or equal to 2 mm, and its effective capacitance may be from 0.5 pF to 2 pF. The above ranges of element sizes and element parameters are calculated and obtained according to many experiment results, and they help to optimize the isolation, the operational bandwidth, and impedance matching of the antenna structure 100.

The invention proposes a novel antenna structure. In comparison to the conventional design, the invention has at least the advantages of high isolation, small size, wide bandwidth, and low manufacturing cost. Therefore, the invention is suitable for application in a variety of mobile communication devices or the IOT (Internet of Things).

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1 to 4. The invention may merely include any one or more features of any one or more embodiments of FIGS. 1 to 4. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a metal mechanism element, having a slot;

a first radiation element, having a first feeding point;

a second radiation element, having a second feeding point;

an impedance element, coupled to the metal mechanism element, wherein the impedance element is disposed between the first radiation element and the second radiation element; and a dielectric substrate, disposed adjacent to the slot of the metal mechanism element, wherein the first radiation element, the second radiation element, and the impedance element are disposed on the dielectric substrate;

wherein the impedance element is configured to increase isolation between the first radiation element and the second radiation element;

wherein the impedance element comprises:

a first metal element, coupled to a first connection point on the metal mechanism element;

a second metal element, coupled to a second connection point on the metal mechanism element;

a third metal element, coupled to a third connection point on the metal mechanism element; and a fourth metal element, coupled to a fourth connection point on the metal mechanism element;

wherein the first metal element, the second metal element, the third metal element, and the fourth metal element are adjacent to each other;

wherein a cross-shaped partition gap is formed between the first metal element, the second metal element, the third metal element, and the fourth metal element;

wherein the first connection point and the second connection point are positioned at an upper side of the slot, and wherein the third connection point and the fourth connection point are positioned at a lower side of the slot.

2. The antenna structure as claimed in claim 1, wherein the slot of the metal mechanism element is a closed slot with a straight-line shape.

3. The antenna structure as claimed in claim 1, wherein the first radiation element substantially has a variable-width L-shape.

4. The antenna structure as claimed in claim 1, wherein the first radiation element has a first vertical projection on the metal mechanism element, and the first vertical projection at least partially overlaps the slot of the metal mechanism element.

5. The antenna structure as claimed in claim 1, wherein the second radiation element substantially has a variable-width L-shape.

6. The antenna structure as claimed in claim 1, wherein the second radiation element has a second vertical projection on the metal mechanism element, and the second vertical projection at least partially overlaps the slot of the metal mechanism element.

7. The antenna structure as claimed in claim 1, wherein the impedance element is a capacitive element.

8. The antenna structure as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

9. The antenna structure as claimed in claim 8, wherein a length of the slot of the metal mechanism element is equal to 0.5 wavelength of the first frequency band.

* * * * *